United States Patent [19]

Van Koppen et al.

[11] 4,420,032
[45] Dec. 13, 1983

[54] METHOD OF CONTROLLING THE ENERGY MANAGEMENT OF AN ENERGY SYSTEM AND ENERGY SYSTEM BASED ON SAID METHOD

[75] Inventors: Christianus W. J. Van Koppen, Eindhoven; Onno Rademaker, Knegsel; Adriaan J. De Ron, Veldhoven, all of Netherlands

[73] Assignee: Eurometaal N.V., Zaandam, Netherlands

[21] Appl. No.: 235,755

[22] Filed: Feb. 18, 1981

[30] Foreign Application Priority Data

Feb. 19, 1980 [NL] Netherlands ................ 8001008

[51] Int. Cl.³ .............................................. F28D 17/00
[52] U.S. Cl. ........................................ 165/1; 165/12; 126/422; 126/419; 126/400; 237/8 R
[58] Field of Search ............... 126/400, 422, 437, 432, 126/428, 419; 237/2 B, 8 R, 55, 12; 236/91 A, 91 F, 68 R; 165/1, 12, 18 R

[56] References Cited

U.S. PATENT DOCUMENTS

| | | | |
|---|---|---|---|
| 3,977,601 | 8/1976 | Bearzi | 126/422 |
| 4,034,912 | 7/1977 | Hayes | 126/422 |
| 4,052,000 | 10/1977 | Honikman | 126/422 |
| 4,190,199 | 2/1980 | Cawley et al. | 126/422 |

FOREIGN PATENT DOCUMENTS

994503 5/1975 Canada .
2405443 4/1979 France .

Primary Examiner—James C. Yeung
Attorney, Agent, or Firm—Diller, Ramik & Wight

[57] ABSTRACT

This invention relates to a method of controlling the energy management of a system for catching, accumulating and transferring heat comprising a heat collector and a heat accumulator of the thermally stratified type forming part of a heat recovery circuit adapted to pass a heat transport fluid, said heat accumulator forming furthermore part of a consumer circuit adapted to pass the heat transport fluid. Experiments have now shown that excellent efficiency is obtained by using this method in which the heat capacity flux, that is to say, the mass flux multiplied by the specific heat of the heat transport fluid through the consumer circuit and the mean value thereof during a selectable time interval, is determined or estimated at least by approximation and the heat capacity flux through the heat recovery circuit is adjusted so that the difference between the mean value of the heat capacity flux through the heat recovery circuit during a time interval of the same duration as said selectable time interval and said mean value of the heat capacity current through the consumer circuit is equal to a factor to be selected multiplied by the heat capacity of the heat accumulator, divided by said time interval, said factor lying between 0 and 3. Further the invention relates to a system for carrying out said method.

4 Claims, 15 Drawing Figures

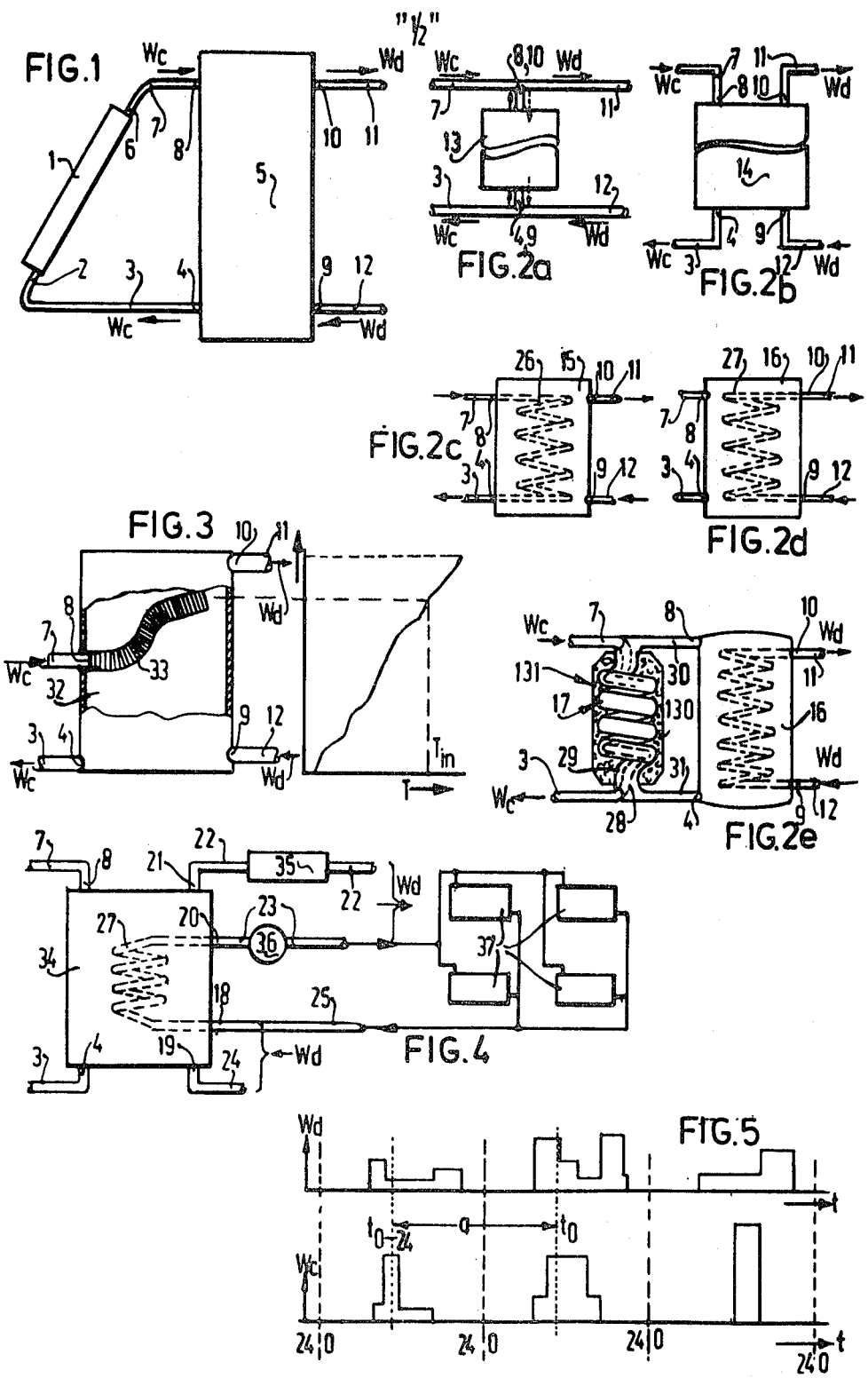

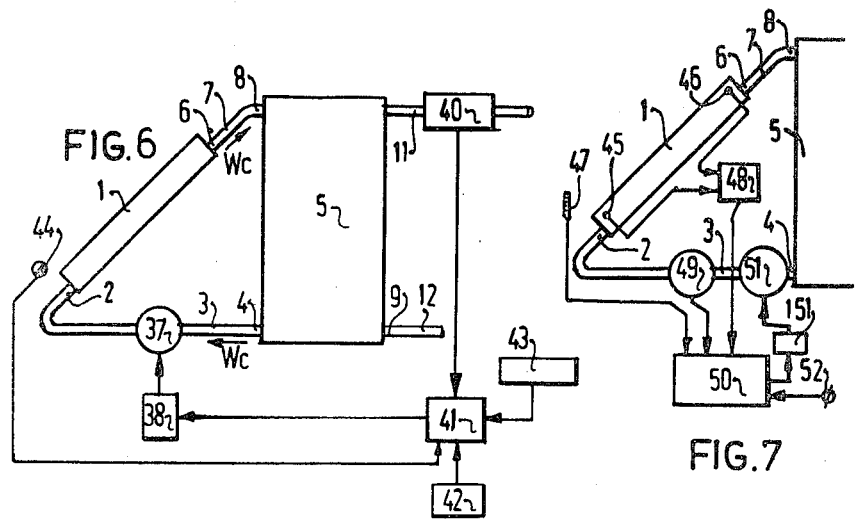
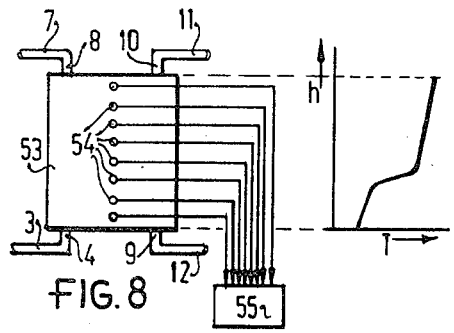
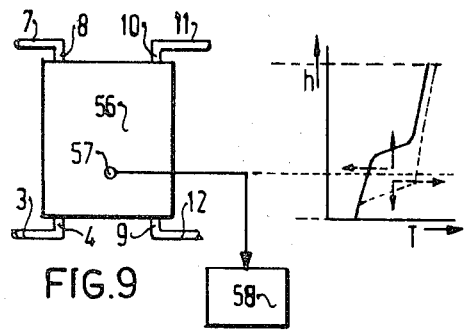
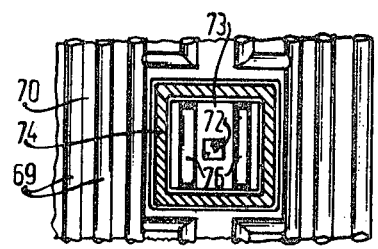
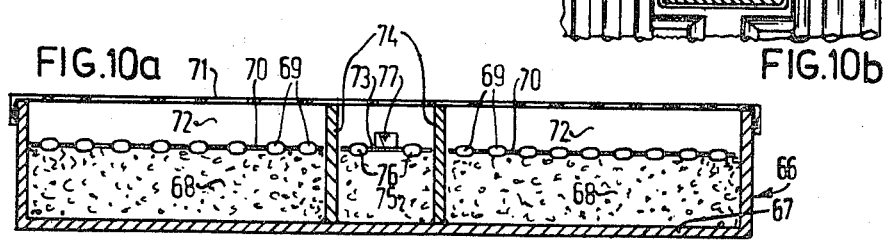

METHOD OF CONTROLLING THE ENERGY MANAGEMENT OF AN ENERGY SYSTEM AND ENERGY SYSTEM BASED ON SAID METHOD

The invention relates to a method of controlling the energy management of a system for capturing, accumulating and transferring heat comprising a heat collector and a heat accumulator of the thermally stratified type forming part of a heat recovery circuit adapted to be flushed by a heat transport fluid, said heat accumulator forming, in addition, part of a consuming circuit adapted to be flushed by the heat transport fluid. The heat may be constituted by solar energy, energy obtained from the surroundings through heat pumps or by waste or residual heat of the kind becoming periodically available.

A heat accumulator of the type having stratified storage (in contrast to the mixed storage) is to mean herein a storing vessel in which practically no temperature equalization takes place in the medium. Heat of higher temperature is retained in higher layers of the storing fluid and heat of lower temperature in lower layers of the fluid (a different order of succession can be imagined, but in practice this is quite an exception). The thermally stratified storage has the advantage that the supply temperature of the fluid withdrawn from the heat accumulator for conducting away the heat captured by the collectors may be appreciably below the mean temperature in the heat accumulator, that is to say, it may be substantially equal to the lowest temperature in the heat accumulator. Conditions being otherwise the same, a lower value of said temperature of the heat transport fluid leads to lower temperatures of the heat absorbing elements in the collector(s) and hence to lower heat losses of the collector(s) towards the surroundings and a higher yield of the system.

Energy systems generally operate under constantly varying conditions. In solar energy systems, for example, the intensity of the solar radiation, the radiation temperature of the sky, the ambient temperature, the wind rate and so on, on the one hand are usually highly variable, and on the other hand, drastic fluctuations occur in the need for heat in terms of size and temperature of the consuming circuit, which may comprise, for example, one or more central heating units and/or tap-water units. The influence of said meterological magnitude (intensity of solar radiation, radiation temperature of the sky, ambient temperature, wind rate) may be represented by an "equivalent temperature" i.e., the temperature stagnant open air should have for transferring exactly the same heat flux to a non-exposed collector.

The heat accumulator serves to ensure optimum attenuation of the changes of heat supply and heat demand. Instantaneously redundant energy is stored for use at a later time.

In low-caloric energy systems i.e., systems intended for supplying heat at temperatures between about ambient temperature and about 150° C. and heat is often stored in water and/or another fluid. Alternatively, storage may take place in a mass of stone or earth, in salts or in other substances exhibiting phase changes at temperature fluctuations or in hygroscopic substances bonding more or less water as a function of temperature. In all these cases heat can be stored in a stratified manner.

Hitherto there has not become known a method of the kind set forth in the preamble in which an energy system has optimum efficiency as a function of prevailing conditions. So far it has been common practice to set a high yield of the collector in conjunction with the use of mixed storage. It is noted here that, for example, in the configuration of FIG. 2b to be described hereinafter, a high yield may give rise to serious disturbance of the stratification.

Experiments have now shown that excellent efficiency is obtained by using a method of the kind set forth in the preamble in which the heat capacity flux, that is to say, the mass flux times the specific heat of the heat transport fluid through the consuming circuit and the mean value thereof in a selectable time interval is at least approximately determined or estimated and the heat capacity flux through the heat recovery circuit is adjusted so that the difference between the mean value of the heat capacity flux through the heat recovery system in a time interval of the same duration as said selectable time interval and the same mean value of the heat capacity flux through the consuming circuit is equal to a selectable factor times the heat capacity of the heat accumulator divided by said time interval, said factor lying between 0 and 3.

For explaining the principle of the invention first the result of the analysis of a solar energy system with a thermally stratified storage will be given in a strongly stylized situation. Secondary effects are left out of consideration. It is assumed inter alia that the intensity of the incident radiation as well as the external temperature and the need for heat are constant during 24 hours and that the behavior of the collector is purely linear. For such a solar energy system under strongly simplified, theoretical conditions, it is true that the highest heat yield occurs when the difference between the mean heat capacity flux through the heat recovery circuit and the mean heat capacity flux through the consumer circuit has the aforesaid value. Neither the volume of the vessel nor the working and return temperature of the consumer circuit play a part in the optimum.

It may be assumed that a corresponding criterion applies to a system in practice be it in an adapted form due to the changing operational conditions.

A first idea of the sense of the adaptation can be obtained by imaging the uniform operation of the collectors to be replaced by an intermittent operation in which the sun uniformly shines for a given number of hours (for example 8 hours) per natural day, however, with an intensity inversely proportional to the number of operational hours. Obviously the achievements of the solar energy system will thus not change essentially provided the storage vessel is (exactly) sufficiently large for containing the fluid supplied during the operation of the collectors in excess of the fluid taken by the consumer circuit. In this period the storage vessel is filled with heated fluid starting at the top and going gradually further downwards. The resultant "heat front" i.e., the interface between the fluid from the collectors and the colder return fluid from the distribution system attains (exactly) the bottom side of the vessel at the end of an operational period of the collector. Immediately thereupon it reverses its direction of movement and reaches again the top side of the vessel (exactly) at the beginning of the next operational period. With regard to the heat capacity flux through the heat recovery system and that through the consumer circuit the above-mentioned, strongly simplified criterion for an optimum yield changes into the further developed criterion mentioned before. In this way, it can be ensured that the heat front will not leave the storage vessel. This corresponds to the aforesaid control criterion according to which the difference between the mean heat capacity flux through the heat recovery circuit and that through the consumer circuit is at least substantially zero. Thus, an excellent yield is obtained as will be obvious, since the temperature of the heat transport fluid will always be relatively low when entering the collector.

It has now been found that a value of the said factor lying between 0 and 3 yields very satisfactory results by coordinate relationship to the foregoing rather than by further development thereof. In view of the foregoing argumentations this seems, at a first glance, to be a strange decision, since in this case the heat front can leave and the fluid regains the collector at a higher temperature.

For a good understanding, reference is made to two important collector properties;

1. Under given weather conditions and at a given inlet temperature the heat flux absorbed by the collector increases according as the heat capacity flux through the collector is higher.

2. Under given weather conditions and a given heat capacity flux through the collector the heat flux absorbed by the collector decreases accordingly as the inlet temperature is higher.

The first property means that provided the inlet temperature is constant or at least independent of the heat capacity flux through the collector any increase in said heat capacity flux brings about an increase in heat yield.

For an optimum control of the energy management of a solar energy system operating in practice, it is desirable to make some forecast; the heat collected by day has to meet as far as possible the need for heat during the evening, night and morning. Therefore, at least a rough prognosis should be available with regard to an optimum control. For such a prognosis a reliable weather forecast may be used as informative data for adapting the heat capacity flux through the heat recovery circuit. In this case particularly a foreseeable change of the weather with respect to that of the preceding day may be used as an information for adapting the heat capacity flux through the heat recovery system.

On the other hand, an expected or intended deviation of the heat capacity flux through the consumer circuit may be used as an information for adapting the heat capacity flux through the heat recovery circuit. Consequently in this case an expected, future pattern of need for heat is taken into accont. The adaptation of the boiler temperature to the external climate known in heat technology may provide such an expected deviation.

In countries having irregular weather conditions it may occur that the first solar radiation of some importance comes later in the day so that due to the shorter time available for collecting heat the requirement of the control-criterion according to the invention could not be satisfied. In such a situation the heat capacity flux through the heat recovery circuit can be adjusted to a correspondingly higher value at the occurrence of the first radiation at an instant later than the selected time of the day.

Apart from the aforesaid adaptations of dynamic nature a deterministic refinement can be achieved in which the degree of latitude and the date, that is to say, the angle of incidence of the solar radiation the maximum intensity and the foreseeable duration thereof are used as an information for adapting the heat capacity flux through the heat recovery circuit.

The heat capacity flux through the heat recovery system can be further adapted to the difference of the instantaneous equivalent temperature of the surroundings of the heat exchange fluid from the inlet temperature of the collector. This temperature difference will hereinafter be termed "the equivalent temperature difference". The instantaneous equivalent temperature may be determined inter alia by measuring the temperature in a thermally insulated part of the collector.

The aforesaid adaptation to the equivalent temperature difference can be carried out in a manner such that at the occurrence of variations of said equivalent temperature difference the heat capacity flux through the heat recovery circuit is varied accordingly. Very satisfactory results provides a control in which the heat capacity flux through the heat recovery circuit is varied proportionally to at least substantially the 0.5 power of the intensity of the equivalent temperature difference reduced by a predetermined threshold value, below which the heat capacity flux through the heat recovery circuit is maintained at zero value.

For the same purpose in the case in which a solar energy collector is of the type comprising a plurality of relatively parallel pipes for passing a heat transport fluid a method may be employed in which in accordance with the invention a different flux is passed through one of the pipes and the difference between the outlet temperatures of a pipe passing a normal flux and a pipe passing a different flux as well as the difference between the outlet temperature and the inlet temperature of one or more pipes are measured, it being calculated on the basis of the resultant values to what extent the collector yield depends upon the flux difference between a pipe of normal flux and the pipe of different flux, the result of the calculation being used for resetting the collector yield in a manner such that the result of calculation is, as far as possible, equal to a predetermined value. This results in a dynamic optimum control automatically matching, for example, the meteorological conditions.

A very satisfactory control is obtained when the aforesaid preselected time interval has at least approximately a duration of an integer multiple of 24 hours. It is thus ensured that the mode of operation exhibits to some extent a given synchronism with the rhythm of the days. In this case the time interval to be preselected extends preferably from one sunset to the next. A sunset is a good gauging instant in the case of a solar energy system. It should be noted that the time interval from one sunset to the next differs slightly from 24 hours.

Apart therefrom or in conjunction with the foregoing the time interval to be preselected may extend from one sunrise to the next one or from the first collector start at a day to the last collector stop at a day.

As a basis for the prognostics for harmonization of the control criterion an assessed pattern of use may be taken, that is to say, the amount of heat given off by the consumer circuit as a function of time.

For example, at any instant the variation of the consumption in a time interval of a plurality of days directly preceding said instant may serve as an information for the adaptation of the heat capacity flux through the heat recovery circuit. A further development of this principle constitutes a method in which a progressing average of said variation of the consumption is assessed. A refinement thereof is a method in which a weighted mean is determined by using a weight function being a monotonous non-rising function of the time elapsing between an instant under consideration and the aforesaid instant. Thus, a time-dependent weighting is obtained, including a given "forget function". For example, a non-weighted average can be determined for seven days, the preceding eighth day and the days preceding the same being left out of consideration. As an alternative, the days may have an individual decreasing weight factor and finally it may be imagined to use a weight factor gradually decreasing with time.

Furthermore, at any instant, the mean value of the heat capacity flux through the consumer circuit during a time interval directly preceding said inlet may be used as an information for adapting the heat capacity flux through the heat recovery circuit.

Apart from the above-mentioned methods and the further elaborations thereof the invention provides a system for carrying said methods into effect. This system comprises a heat collector included in a heat recovery circuit adapted to pass a heat transferring fluid and a heat accumulator which is furthermore included in a consumer circuit adapted to pass a heat transport fluid and according to the invention the system is characterized by means for assessing the heat capacity flux through the consumer circuit, time-measuring means, memory means for storing measuring data from the flux measuring means and the time measuring means, arithmetic means for calculating the mean value of the heat capacity flux through the consumer circuit during a selected time interval and by control-means for regulating the heat capacity flux through the heat recovery circuit in dependence upon the mean value calculated by the arithmetic means.

The said assessing means may be constructed in the form of a matter flow meter providing an electric output signal and a multiplying unit for multiplying the output signal of the flow meter by a factor corresponding to the specific heat of the relevant heat transport fluid. The memory means may be designed for storing the data from the arithmetic means in addition to the data from the assessing means and the time-measuring means.

Read means may be provided for introducing information into the memory means.

The arithmetic means may be coupled with the memory means for the reception of information therefrom for selecting the said time interval to be chosen.

The control means may be constructed in the form of an adjustable pump included in the heat recovery system either of the continuously or stepwise adjustable type. The heat recovery circuit may, as an alternative, include a pump while the control means are formed by a choke and/or distribution valve also included in the heat recovery circuit either of the continuously or stepwise adjustable type.

With the control means may be coupled radiation detection means for detecting radiation from the sun in order to set the heat capacity flux through the heat recovery circuit at a higher value accordingly as the instant of the first solar radiation is later than the instant of the day to be selected.

Furthermore, means may be coupled with the control-means for assessing the equivalent temperature difference i.e., the difference between the instantaneous equivalent temperature and the inlet temperature of the collector. These measuring means may be formed by a photoelectric element or a temperature detector at the input and at the output sides of the solar energy collector for measuring the temperature difference between the input and the output of the collector, measuring means for measuring the heat capacity flux through the heat recovery circuit and a temperature detector disposed freely in the surroundings, the outputs of said temperature detectors and the measuring means being connected with an arithmetic unit for assessing the equivalent temperature difference. With the control-means may be connected means for assessing the equivalent temperature, said means being formed by a temperature detector arranged in a collector plate forming part of the solar energy collector and arranged in an essentially thermally insulated part thereof, in which part the heat transfer fluid is stagnant or lacking.

In view of the shift of the above-mentioned heat front in the heat accumulator the invention provides, as stated above, a method in which said time interval to be selected is chosen in accordance with the heat content of the heat accumulator. For carrying out a method of this kind the invention provides a system comprising a temperature feeler thermally coupled with the consumer circuit, having its output connected with an input of a comparator, to the other input of which is applied a reference signal corresponding to a desired temperature at the area of the temperature feeler. It should be noted that the system condition can be calculated on the basis of the measurements of input and output magnitudes.

Preferably, the dimensions of the system according to the invention are chosen in accordance with the amount of solar energy to be captured by the solar energy collector in the preselected time interval and with the energy to be expectantly given off through the consumer circuit during a time interval of the same duration.

An optimum, flexible system, which is relatively cheap in mass production, is obtained when the time measuring means, the memory means and the arithmetic means comprise a microprocessor or else form part thereof.

There may be provided means for enhancing the heat capacity flux through the heat recovery circuit at an imminent transgression of a predetermined value of the heat transfer heat mean temperature at the output of the collector, in particular, by rendering the heat capacity flux additionally dependent upon the exit temperature of the collector, for example, to an extent such that it remains substantially constant.

For assessing the temperature at least at one area in the heat accumulator temperature measuring means can be arranged in said heat accumulator in the form of at least one temperature feeler mounted at least at about one third of the height of the heat accumulator in a preferred embodiment. With this or each temperature feeler may be coupled means for decreasing or increasing the heat capacity flux through the heat recovery circuit when the temperature measured by the temperature feeler becomes higher or lower respectively then a predetermined value, which may vary with the season, the weather and/or the climate.

The invention will now be described more fully with reference to the annexed drawing. By way of random example the drawing shows a solar energy system. The drawing shows in FIG. 1 a basic diagram of a solar energy system, FIG. 2a a first embodiment of a heat accumulator forming part of the system of FIG. 1, the heat recovery circuit not being separated from the consumer circuit, FIG. 2b a variant thereof, FIG. 2c a heat accumulator, in which the circuits are singularly separated, FIG. 2d a variant thereof, FIG. 2e a heat accumulator having a separate circuits, the heat recovery circuit including, in addition, a heat exchanger, FIG. 3 a different embodiment of the accumulator shown in FIG. 2b, in which means are arranged for ensuring a satisfactory thermal stratification of the storage with, in addition, a potential temperature profile in the accumulator, FIG. 4 part of a solar energy system in which the consumer circuit comprises more than one circuit, FIG. 5 an example of a potential variation of the heat capacity fluxes through the two circuits during a period of a few days, FIG. 6 a diagram of a solar energy system in accordance with the invention, FIG. 7 part of a variant of the system shown in FIG. 6, FIG. 8a a heat accumulator comprising a plurality of temperature feelers and having a temperature profile measured by said temperature feelers, FIG. 9 a heat accumulator having one temperature feeler and at the side thereof a temperature to be measured by said temperature feeler at different instants, FIG. 10a a sectional view of a solar energy collector having a measuring part; and FIG. 10b a plan view of a cutting of the collector shown in FIG. 10a comprising the measuring part.

FIG. 1 shows a generalized basic diagram of a solar energy system. This solar energy system comprises a solar energy collector 1 constructed in the form of at least one collector plate adapted to pass a heat transport fluid and having its inlet 2 connected through a duct 3 with a first outlet 4 of a heat accumulator 5. The outlet 6 of the solar energy collector 1 communicates through a duct 7 with a first inlet 8 of the heat accumulator 5. The heat accumulator 5 has furthermore a second inlet 9 and a second outlet 10. The duct 3, the solar energy collector 1 and the duct 7 together with part of the heat accumulator 5 constitute a heat recovery through which passes a heat transport fluid. This heat transport fluid is heated by radiation incident to the collector 1 and then serves for enhacing the heat content of the heat accumulator 5. The heat capacity flux i.e., the mass flux times the specific heat of the heat transport fluid through the heat recovery circuit is indicated by the arrows $W_c$ in FIG. 1.

The heat accumulator 5 is furthermore included in a consumer circuit, part of which is formed by the second inlet 9 and the second outlet 10 of the heat accumulator 5. The heat capacity flux through this consumer circuit is indicated in the drawing by the arrows $W_d$.

It will be obvious that the heat capacity flux $W_d$ through the consumer circuit depends upon the heat consumption pattern i.e., on the amount of heated medium and its temperature as a function of time and that it may highly differ from one solar energy system to another. This heat capacity flux $W_d$ may be considered to be a datum that, in principle, cannot be influenced. This datum may be used for obtaining a high efficiency of the energy management of the solar energy system. In the solar energy system according to the invention, as stated above, maximum efficiency is attained by adapting the heat capacity flux $W_c$ through the heat catchment circuit inter alia to the assessed or foreseeable heat capacity flux $W_d$ through the consumer circuit. As an alternative, the heat capacity flux on the consumer side may, of course, be varied, since the invention relates to the difference between the heat capacity fluxes at the inlet and the outlet $W_c$ and $W_d$ respectively.

FIG. 1 shows the simplest diagram of a solar energy system. FIGS. 2a to 2e illustrate more in detail how the heat coupling between the heat recovery circuit and the consumer circuit can be established.

FIG. 2a shows a heat accumulator 13 having two connections with the junction of the ducts 3 and 12 respectively. The topmost duct of the heat accumulator 13 serves both as a first inlet and as a second outlet. The lowermost duct of the accumulator 13 serves both as a first outlet and as a second inlet. Therefore, the said top duct is designated by 8, 10 and the lower duct by 4, 9. The solid arrows near the ducts 8, 10 and 4, 9 denote the case in which heated medium stored in the heat accumulator 13 leaves the heat accumulator 13 in the direction of the duct 11, whereas the broken arrows indicate the case in which relatively cool medium on the lower side in the heat accumulator 13 flows in the direction of the duct 3 for being further heated by a solar energy collector.

In this arrangement of FIG. 2a it may occur that the medium in the heat accumulator 13 remains fully stationary, while part of the heat requirement of the consumer circuit is directly satisfied by the heat supplied by a solar energy collector via the duct 7. The remaining part can be supplied by an auxiliary heater not shown in FIG. 2a.

FIG. 2b shows a variant of the arrangement of FIG. 2a. Herein the ducts 7 and 11 and the ducts 3 and 12 are not interconnected, but they individually communicate with the heat accumulator 14.

The arrangements of FIGS. 2a and 2b have obviously in common that there is no separation between the heat recovery circuit and the consumer circuit. If it is desired to use the system for hot tapwater supply, the whole system is fed by water from the water mains. For such a use these systems of FIGS. 2a and 2b have the disadvantage that the use of antifreeze agents is not possible.

FIGS. 2c and 2d show an arrangement in which a singular separation is made between the heat recovery circuit and the consumer circuit. In the arrangement of FIG. 2c the heat accumulator 15 comprises a helically would tubing 26 serving as a heat exchanger 26 connected between the first inlet 8 and the first outlet 4, said helix being completely surrounded by heat transfer medium of the consumer circuit. In the arrangement of FIG. 2d a heat exchanger helix 27 forms part of the cosumer circuit so that here the heat accumulator 16 is completely filled with heat transport fluid of the heat recovery circuit.

When accumulators of the kind shown in FIGS. 2c and 2d are employed, anti-freeze agents or other media than drinking water can be used in contrast to the accumulators of FIGS. 2a and 2b.

FIG. 2e shows a further development of the arrangement of FIG. 2d. In this case the ducts 7 and 10 are not directly coupled with the first inlet 8 and the first outlet 4 respectively of the heat accumulator 16, since between them is, in addition, arranged a heat exchanger 17. This heat exchanger 17 is constructed as follows; between the ducts 3 and 7 is arranged a helical duct 28, around which inner helix is arranged substantially coaxially a hollow outer helix 29, the ends of which are connected with the heat accumulator 16 through a duct 30 with the first inlet 8 and through a duct 31 respectively with the first outlet 4. It should be noted that despite the medium separation between the ducts 7, 28, 3 and 30,29, 4 the heat capacity flux $W_c$ performs in the manner indicated in FIG. 2e by the arrows $W_c$. The outer helix 30 is completely surrounded by a filling 130 of heat insulating material accommodated in a housing 131.

FIG. 3 shows a variant of the heat accumulator of FIG. 2b, that is to say, an accumulator without medium separation between the two circuits. The accumulator 32 of FIG. 3 comprises means for ensuring an excellent stratification. For this purpose the first inlet 8 of the accumulator 32 is placed approximately midway the height of the vessel. With this inlet 8 is connected an extremely thin-walled, flexible, "floating" inlet tube 33, the free end of which opens out in the interior of the heat accumulator 32. The heat transfer medium entering through the duct 7 has a temperature $T_{in}$. The medium inside the heat accumulator 32 has a thermally inhomogeneous structure and may be thermally statified as is indicated in the graph on the right-hand side of FIG. 3. The graph shows the temperature T plotted on the abscissa as a function of the height with respect to the lower boundary of the accumulator 32. It is known that the density of each medium depends upon its temperature. If the floating inlet tube 33, particularly its free end were located in such a part of the heat accumulator that the temperature of the medium inside the inlet tube 33 is higher than that at the point concerned, an upward force is produced, which decreases according as the temperature difference decreases. According to circumstances, the same reasoning applies to the situation in which the end of the inlet tube 33 is at a temperature level above $T_{in}$. It will, therefore, be obvious that such forces become operative that finally the end of the inlet tube remains at a temperature level inside the heat accumulator which is at least substantially equal to the temperature of the entering medium $T_{in}$. By this arrangement and use of the floating inlet tube 33, a substantially perfect thermal stratification of the medium can be obtained inside the heat accumulator 32. With reference to FIG. 5, it will be explained hereinafter why this stratification is of such importance.

FIG. 4 shows a heat accumulator 34 communicating on the one hand with the ducts 7 and 3 and on the other hand with a bipartite consumer circuit. One part of the consumer circuit is formed by a duct 24, which may be connected with a water mains, by a water inlet from said water mains towards the interior of the accumulator 34, by a second outlet 21 for said water, by a duct 22 in a heat capacity flux meter constructed in the form of a flow rate meter, said duct 22 being finally connected with hot water taps. Besides, it should be noted that the heat recovery circuit may also include means for measuring the heat capacity flux. The second part of the consumer circuit comprises a duct 25, a third inlet for the heat accumulator 34, a heat exchanger helix 27 (see also FIG. 2d), a third outlet 20 and a duct 23 including a pump 36. Between the ducts 23 and 25 is connected a heating system having a plurality of heating units 37. It is emphasized that the heat capacity flux through the overall consumer circuit, that is to say, the heat capacity flux through the ducts 22, 24 and the ducts 23, 25 corresponds to the heat capacity flux $W_d$ through the consumer circuit indicated in FIGS. 1, 2 and 3. Hereinafter it will be described more in detail how the results measured by the flow rate meter are used as data for controlling the solar energy system according to the invention. In this simple embodiment the pump 36 is provided with an energizing unit (not shown) for switching it on or off so that the energizing signal is also indicative of the heat capacity flux through the ducts 23, 25. In this way the energizing signal together with the output signal of the flow rate meter 35 may serve to determine the overall heat capacity flux through the complete consumer circuit. The use of the energizing signal constitutes essentially the simplest form of the aforesaid assessing means.

FIG. 5 shows by way of example a strongly simplified, stylized diagram of the potential variation of the heat capacity flux $W_d$ through the consumer circuit and of the heat capacity flux $W_c$ through the heat recovery circuit for a period of about three days. The time is plotted on the abscissa. One day from 0 to 24 hours corresponds to each interval indicated by vertical, broken lines.

As stated above, the heat capacity flux $W_d$ through the consumer circuit is usually considered as an input datum. This is not altered by a control-system of the embodiments shown. It should be noted, however, that the control criterion according to the invention is concerned with the relationship between the heat capacity fluxes through the heat recovery circuit and the consumer circuit so that an adaptation of the heat capacity flux on the consumer side also lies within the scope of the invention.

It will be apparent from the stylized diagram of $W_d$ that the first need for heat on the side of the consumer(s) occurs, for example, at seven o'clock in the morning. The heat emanating from the heat accumulator is employed for heating a house by means of a central heating system, for washing, a shower bath, the preparation of the breakfast and so on. This need for heat is found to be comparatively high at the beginning of the day and afterwards it drops to a comparatively low, more or less stable value. In the evening the need for heat again increases, for example, because most members of a family are at home or because the outdoor temperature becomes lower. A more or less analogous pattern can be found the second day. The overall need for heat, that is to say, a magnitude corresponding to the integral of $W_d$ that can be derived from the Figure in the form of the surface bounded by the t-axis and the $W_d$ curve appears to be higher at the second day than at the first day. The third day shows a variation, for example, due to the absence of the consumers, while a central heating system automatically switches on at a given instant. The increase in heat consumption towards the evening is referred to above.

As stated above, the lower side of FIG. 5 shows the variation of the heat capacity flux $W_c$ through the heat recovery circuit. Up to a given instant in the morning, in the example shown at about 8 o'clock, $W_c$ appears to be equal to zero. This is to be attributed to the fact that prior to said instant there apparently was no or no sufficient solar radiation for producing a temperature increase of the heat transport medium which may flow through the solar energy collector. If the value of $W_c$ during the night were not equal to zero, the heat content of the accumulator might and even would most probably decrease, since the solar energy collector gives off heat to the surroundings. This is, of course, undesirable, unless cooling rather than heating is aimed at. About the variation of $W_c$ during the first two days indicated in FIG. 6 hardly any generalizing remark can be made. It is stated above which criteria underlies or may underlie the value of $W_c$ to be influenced by the control-system in dependence on the assessed developments in the past and the development to be expected in the future. With respect to the variation of $W_c$ during the third day it may be noted that apparently at a later instant of the day, in this example around twelve o'clock, the first solar radiation has occurred. As discussed above such circumstances involve the risk that by using the primary control criterion according to the invention no optimum results will be obtained during said day, since, for example, after one or two hours the sun may again stop shining. Therefore, in this case after the detection of the first useful solar radiation the heat capacity flux $W_c$ through the heat recovery circuit is adjusted to and maintained at a correspondingly higher value until the detected, useful solar radiation again drops below a given value.

The interval a and the instant $t_o$ in FIG. 5 show by way of example how the desired adaptation of $W_c$ can take place under consideration of past and future. In this example the interval a has a duration of 24 hours from an instant $t_o-24$ (wherein $t_o$ is expressed in hours) to the instant $t_o$, i.e. the instant at which a control decision is taken, that is to say, at "the present". Strictly speaking, the variation after $t_o$ at the present is not known so that the graphs of $W_d$ and $W_c$ are not completed. At the instant $t_o$ the expected mean heat capacity flux $W_d$ is employed by the consumer circuit as the input datum in order to determine which heat capacity flux $W_c$ through the heat recovery circuit has to be adjusted for the closest approximation of said criterion, that is to say, the relationship of the mean heat capacity fluxes. This rule implies the expectation that during the twelve hours after the instant $t_o$ the heat capacity flux $W_d$ through the consumer circuit will not appreciably differ from $W_d$ during the correspondingly twelve hours of the preceding day.

It is again emphasized that FIG. 5 and the principle of control briefly discussed with reference thereto are only concerned with a drastically stylized situation and a highly simplified control.

FIG. 6 illustrates a diagram of a solar energy system according to the invention. This system is basically identical to the system shown in FIG. 1, but means are added for controlling partly automatically and partly by external intervention the heat management of the system on the basis of the aforesaid control criteria. The heat capacity flux through the heat recovery circuit is obtained from a pump 37 included in the heat recovery circuit. The actuation of this pump depends on an energizing unit 38, which in turn receives control-signals from a memory/arithmetic unit 41.

The consumer circuit includes a flow rate meter 40 for measuring the heat capacity flux through the consumer circuit. The output signals of this flow rate meter are applied to the memory/arithmetic unit 41, which also receives data from a time measuring unit 42. This time measuring unit 42 may be synchronized with the electric mains, but it may alternatively be formed by a quartz clock. To the unit 41 are further applied data emanating from a read-in unit 43. This read-in unit 43 may serve to introduce an encoded weather forecast, an expected consumption pattern or the like. Known optical display means for the visual indication of data applied by the read-in unit to the memory or of other relevant data or information available in the control-system and of interest to the consumer are omitted from the Figure. The arithmetic unit 39 furthermore receives signals emanating from a photo-electric cell 44 and being a measure for the intensity of the incident radiation so that reaction to the instantaneous intensity of this radiation is also possible. The arithmetic unit 39 may also be provided with comparison means to ensure detection of the occurrence of a given minimum intensity. This corresponds, for example, to the variation of $W_c$ in FIG. 5 during the third day.

It should be noted that the output signals of the flow rate meter in themselves do not provide sufficient data for determining the heat capacity flux through the duct 11. These output signals have to be multiplied by a factor corresponding to the specific heat of the heat transport medium concerned. This multiplication can be simply carried out by amplifying or attentuating the output signals of the flow rate meter by the correct value.

From the above-described control criteria and the discussion of the system shown in FIG. 6, it will be apparent how the solar energy system of FIG. 6 according to the invention is capable of adapting the heat capacity flux $W_c$ through the heat recovery circuit in order to obtain maximum efficiency. The arithmetic unit 41 may be adapted to process the signal from the photo-electric cell 44 in a manner such that the heat capacity flux $W_c$ through the heat recovery circuit is varied proportionally to at least approximately the 0.5 power of the equivalent temperature difference diminished by a predetermined threshold value, below which threshold value the heat capacity flux through the heat recovery circuit is maintained at zero value by not energizing the energizing unit 38.

FIG. 7 shows a variant of the system of FIG. 6. In this case, the difference between the equivalent temperature and the inlet temperature of the collector is assessed by measuring the temperature difference between the inlet and outlet of the solar energy collector, the heat capacity flux through the solar energy collector forming part of the heat recovery circuit and the ambient temperature. For this purpose the inlet and the outlet of the solar energy collector 1 are provided each with a temperature sensor 45 and 46 respectively, while in the free surroundings near the solar energy collector, an outer temperature sensor 47 is disposed. The temperature sensors 45 and 46 apply their output signals to a measuring and comparing unit 48. The output signal of the unit 48, like the output signal of the outer temperature sensor 47 and that of a flow rate meter 49 included in the consumer circuit is applied to an arithmetic unit 50. It will be apparent to the expert that these three input data are sufficient to determine the aforesaid temperature difference. In this example a measurement of the speed of wind is dispensed with because it is assumed that it represents a secondary effect. The output signal of the arithmetic unit is applied to an energizing unit 151, which serves to govern the energization condition of a pump 51 included in the duct 3. To the computer unit 50 are applied further data in analogy with the system shown in FIG. 7 which is symbolically designated by the input connection 52.

FIG. 8 shows a heat accumulator 53 in which a plurality of temperature sensors 54 are distributed from the lower wall to the top wall of the heat accumulator 53. The temperature sensors 54 are all connected separately with a temperature measuring unit 55, which is capable of assessing the temperature distribution in the heat accumulator on the basis of the output signals of the temperature sensors 54. For example, a temperature variation with the height can be obtained as is graphically indicated on the right-hand side of the heat accumulator 53. It will be obvious that this graphical representation must have a discrete form. For the sake of clarity, it is represented in a continuous form. The temperature measuring unit is coupled with an arithmetic unit (not shown) for the supply of signals corresponding to the temperature profile or variations thereof. Since the shift of the temperature profile in the heat accumulator 53 constitutes an important datum for the combination of heat supply to the accumulator from the heat recovery circuit and the heat dissipation through the consumer circuit. Therefore, the temperature measuring unit 55 may be provided with comparing means coupled, for example, with the lower and the upper temperature sensors 54 in order to detect the rise or the drop of the temperature above or below a given value respectively. As stated above, such a detection can be responded to by increasing or decreasing the heat capacity flux through the heat recovery circuit.

It should be noted that the flexibility of the system increases in proportion to the capacity of the accumulator. However, disadvantages of large storing vessels are the high cost of manufacture and the required, expensive insulation. It is usually efficient to limit the heat storing capacity to the heat that can be captured by the collector during one or more clear days, for example, in spring or in autumn.

FIG. 9 shows a simplified variant of the system of FIG. 8, in which a heat accumulator 56 is provided with a temperature sensor 57 arranged at about one third of its height. The output signal of the temperature feeler 57 is applied to a temperature measuring and comparing unit 58. The latter compares the output signal of the temperature sensor 57 with a comparison signal corresponding to a given temperature in order to detect the occurrence of a given temperature change. It can thus be assessed whether the heat front referred to above passes by the temperature sensor 57. The graph on the right-hand side of the heat accumulator 56 shows a temperature variation in the heat accumulator as a function of the height at three different instants. The two solid arrows indicate a shift of the heat front. The broken arrows indicate the corresponding change of the temperature detected by the temperature sensor 57.

FIG. 10a shows with reference to a cross-sectional view of a solar energy collector according to the invention, how the equivalent temperature can be measured. The collector 66 comprises a trough 67, which is open on the top side and in which a collector plate 70 provided with flow tubes 69 is arranged on a thermally insulating layer 68. On the open top side the trough 67 is cover plate 71 of glass or a transparent synthetic resin, the downwardly extending sides of which cover the outer sides of the trough 67. An air cavity 72 is formed between the collector plate 70 and the cover plate 71.

FIG. 10 shows that in this embodiment the collector plate 70 has a part cut away for accommodating a separate plate portion 73 in a thermally insulated manner. At the edges the plate portion 73 is surrounded by a thermally insulating cylinder 74, which together with the plate portion 73 and the bottom of the trough 67, defines a space in which a thermally insulating layer 75 is provided. In the embodiment shown the plate portion 73 is provided with tubes 76, which are not traversed by medium in contrast to the tubes 69. They are filled with medium and closed at their ends.

A temperature sensor 77, for example, a semiconductor element is thermally coupled with the plate portion 73.

The measuring part of the solar energy collector 66 comprising the elements 73 to 77 is designed for indicating the temperature of the solar energy collector in the case of stagnant medium. This temperature is the equivalent temperature. The output signal of the sensor 77 corresponding to its temperature can be applied, fully in analogy with the configuration of FIG. 6, to a memory/computer unit 41 designed for adjusting the heat capacity flux through the heat recovery circuit also on the basis of the assessed equivalent temperature difference.

The measuring part may, as an alternative, be designed so that it comprises a plate portion corresponding with the plate portion 73 without tubes or with empty tubes.

Further refined, but possibly unproportionally more expensive is the variant of the principle illustrated in FIG. 8 in which the measuring part also comprises a thermally insulated portion of the cover plate. As a further alternative the measuring part may be constructed in the form of a separate collector unit.

FIG. 10b is a plan view of a cut-out portion of the collector shown in FIG. 10a, in which the measuring part is accommodated. The respective components are designated by the same reference numerals as in FIG. 10b.

The invention is not limited to the embodiments mentioned in the foregoing and described with reference to the drawing. Many modifications of the component parts and their relationship may be designed within the scope of the invention.

Various combinations of the variants shown in the respective Figures may be imagined.

The detection of the passage of the heat front as it takes place in the accumulator shown in FIG. 9 with the aid of the temperature sensor 57 may, as an alternative, be carried out by means of a bimetallic element arranged at a corresponding place, whose temperature-dependent flexure may serve for the mechanical control of a valve included in the duct 3 or 8.

In the heat catchment circuit may furthermore be employed a pump provided with means lowering the medium displacement of the pump with an increasing inlet temperature.

A very compact and very flexible control unit can be obtained by incorporating a number of the electronic control units described in a computer. This applies in particular to the memory 41, the time measuring unit 42, the arithmetic unit 39, the arithmetic unit 50, the temperature measuring unit 55, the temperature measuring and comparing unit 58 and the arithmetic unit 61.

An important advantage of a programmable computer is that, if desired, drastic modifications of the desired, complicated control strategy can be simply and rapidly carried out, for example, if they are required due to changes of the solar energy system or of the surroundings.

With respect to FIG. 2e, it is noted that the separation between the circuits by the additional heat exchanger may, as an alternative and probably with preference, be carried out on the side of the consumer circuit.

The use of a helical heat transfer duct in the heat accumulator as shown in FIGS. 2c, 2d, 2e and 4 brings about a certain degree of deterioration of the stratification. However, there is a given margin with respect to the ideal stratification.

Reference is emphatically made to the possibility of using the method and the system according to the invention for a very effective cooling, in which case the heat given off by the consumer circuit is conducted away through the collector. For this purpose a number of reversals which are self-explanatory to the expert, can be carried out.

In the foregoing, there is invariably concerned a trend to increase in efficiency. It will be obvious, however, that a desired yield can be obtained by simpler means than the conventional ones by carrying out the invention. The collector may, for example, be manufactured at lower cost by omitting the conventional cover plate and/or the spectral selective layer.

Known safety means against excess pressure or extreme temperature likely to damage a system according to the invention are not shown or described.

The temperature sensor 57 shown in FIG. 9 may be vertically movable. Thus, with the aid of a single sensor information can be obtained about the temperature distribution in the entire storage vessel as, for example, in the embodiment shown in FIG. 8.

What is claimed is:

1. The method of controlling a heat transfer system so as to yield high efficiency, comprising the steps of:

(a) providing a heat accumulating device having a heat capacity $Q_a$;
    (b) transferring heat by circulating a heat transfer fluid in a loop between an environmental heat transfer device and the heat accumulating device and effecting such circulation so that the temperature of fluid in the accumulating device is highly stratified;
    (c) employing the highly stratified heat transfer fluid in the accumulating device to transfer heat at a consumer facility by circulating the stratified heat transfer fluid between the consumer facility and the accumulating device and effecting such circulation so that stratification of the temperature of the heat transfer medium tends to be retained;
    (d) determining the quantity of heat transferred in step (c) over a selected period of time; and
    (e) controlling the circulation of step (b) such that the difference between the heat transferred in step (b) over a time period of duration equal to that of said selected period of time and the quantity of heat determined in step (d) is equal to $n(Q_a)$ where n is 0 to 3.

2. A method as claimed in claim 1 characterized in that the selected period of time has at least substantially a duration of an integral number of 24 hours.

3. A method as claimed in claim 2 characterized in that the selected period of time interval extends from one sunset to the next sunset.

4. A method as claimed in claim 1 characterized in that the selected period of time extends from one sunrise to the next-following sunset.

* * * * *